United States Patent [19]

Loup

[11] 4,308,891

[45] Jan. 5, 1982

[54] TERMINAL BLOCKS AND INDICATOR FOR SOLENOID VALVES

[75] Inventor: Ronald L. Loup, Clarkston, Mich.

[73] Assignee: Double A Products Co., Manchester, Mich.

[21] Appl. No.: 135,974

[22] Filed: Mar. 31, 1980

[51] Int. Cl.[3] .............................................. F16K 31/02

[52] U.S. Cl. ............................... 137/551; 137/625.65; 251/129; 251/137; 339/14 R

[58] Field of Search ................... 137/551, 554, 625.65; 251/129, 137; 339/14 R, 49 R, 182 R, 193 R, 176 R, 176 M

[56] References Cited

U.S. PATENT DOCUMENTS 3,153,749 10/1964 Andrews ......................... 251/137 X
3,201,786 8/1965 Anderson et al. ......... 339/176 M X
3,254,675 6/1966 Johnson .......................... 137/625.65
3,643,201 2/1972 Harwood ...................... 339/14 R X
3,701,366 10/1972 Tirelli et al. .................... 251/137 X
4,197,995 4/1980 Campbell et al. .............. 137/551 X

*Primary Examiner*—William R. Cline
*Attorney, Agent, or Firm*—Olsen and Stephenson

[57] ABSTRACT

Solenoid operated directional valves are disclosed requiring minimum labor costs for original manufacture, installation at sites of use and subsequent maintenance and repair, which have electrical apparatus for actuating the solenoids, including improved terminal blocks mounted on the valve body and electrical plugs and associated junction boxes by which electrical power is supplied to the terminal block for delivery to the appropriate solenoid, the terminal block and electrical plugs having electrical connectors to enable the electrical plug and junction box to be mounted in more than one position with respect to the terminal block while providing continuity of operation of the solenoids, ground connections and lamp indicator means.

20 Claims, 11 Drawing Figures

Fig-1
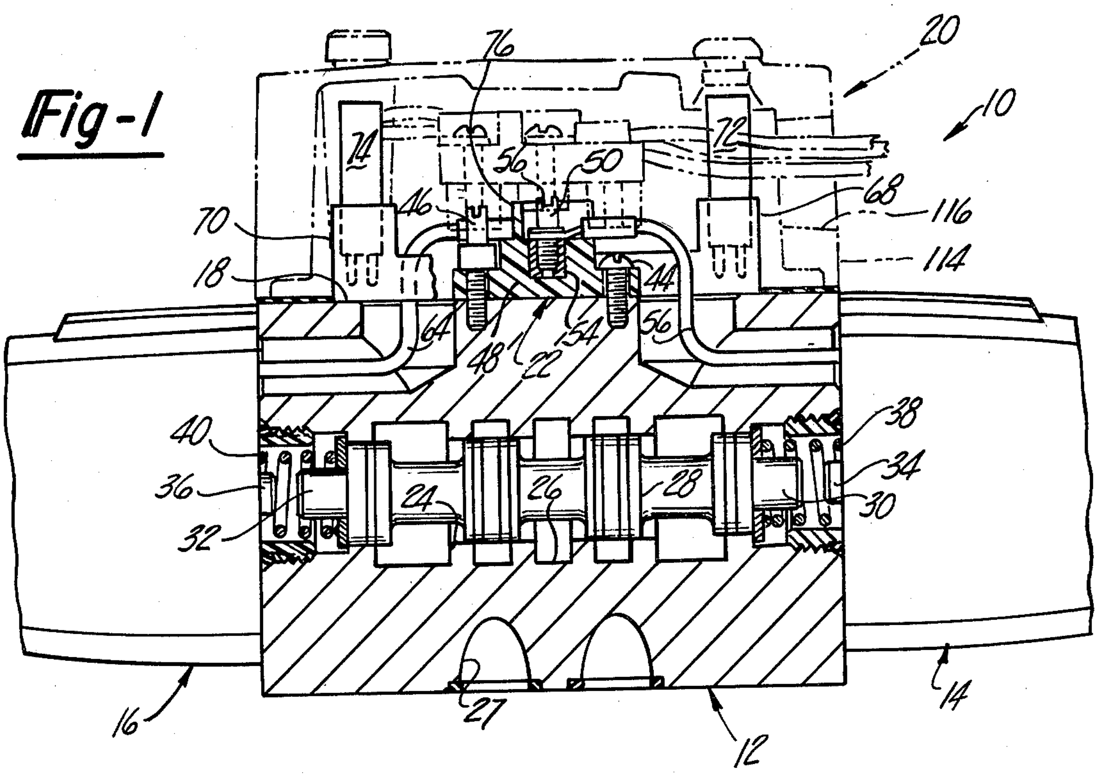
Fig-2
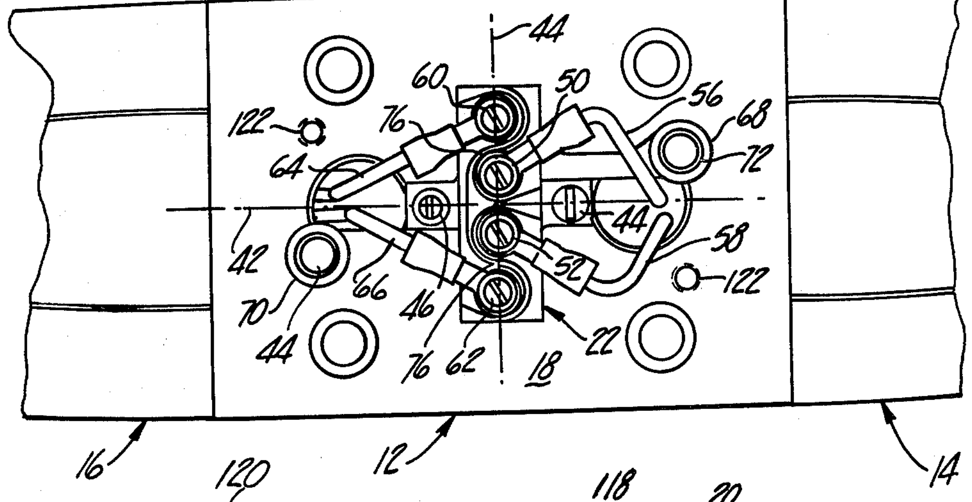
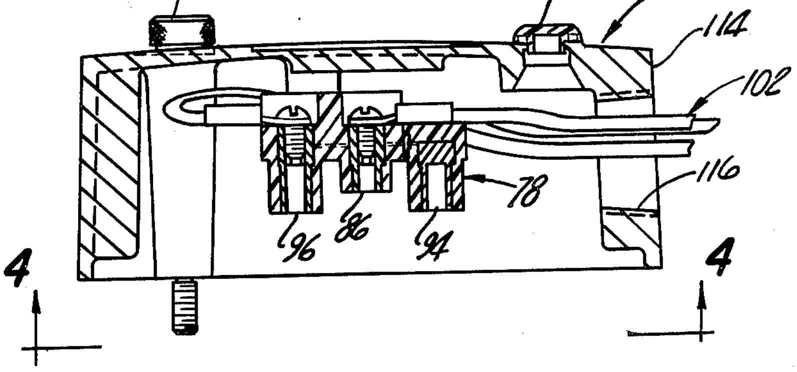
Fig-3

TERMINAL BLOCKS AND INDICATOR FOR SOLENOID VALVES

TECHNICAL FIELD

The present invention relates to single or double solenoid operated directional valves for directing flow of hydraulic fluid, and more particularly to the electrical apparatus mounted on the valve body for controlling operation of one or both solenoids that are mounted on one or both ends of the valve body.

BACKGROUND ART

It is conventional practice in the prior art relating to directional valves to provide a mounting surface on one side of the valve body and to secure to that side a terminal block containing a ground connector and electrical connectors to which electrical leads from each solenoid extend and are connected. A junction box is releasably mounted on the mounting surface so as to enclose the terminal block, and the junction box is provided at one end with an electrical conduit port for receiving or mounting a receptacle through which electrical current from an external source can be supplied to the terminal block for actuating the one or two solenoids of the directional valve. In this respect, it is known to mount an electrical conduit receptacle in the electrical conduit port of the junction box and to provide suitable leads that extend from the receptacle to the terminal block. The electrical conduit may have at its end either a five pin plug (for double solenoid valves) or a three pin plug (for single solenoid valves) by which it is connected to the receptacle. It is also known to extend the individual conductors from the receptacle to an electrical plug that is structurally separate from the junction box but located therein, and to plug this electrical plug onto the terminal block to complete the required electrical circuits associated with the solenoids. In these prior art structures the terminal blocks are constructed and arranged so that the connectors will be located adjacent to their associated solenoids.

It is desirable when using directional valves of the foregoing character to provide indicators for revealing to operators when a solenoid of the valve is energized. For this purpose, the prior art discloses the use of light indicator means. A construction of this type is normally provided by connecting a lamp socket into the circuit of each solenoid so that when the solenoid is energized, a lamp in the socket will be illuminated. By locating the lamp adjacent to the solenoid, the operator can readily identify the solenoid that is energized.

Because of the confined working space and large number of electrical leads that must be connected to the terminal block, to the electrical plug and to the other components, substantial labor costs are involved in original equipment manufacture as well as in an installation at the site of use of the directional valve, and subsequently, also for maintenance purposes. Further, the possibility that erroneous connections can be made is significant.

Particular problems may also arise in some instances during installation or maintenance. During assembly of the original equipment, the electrical apparatus must be connected together without knowledge of the direction from which the source of electric power will be supplied and without knowledge of mounting restrictions that may exist for the directional valve. Often at the site of installation it becomes necessary to reverse the longitudinal direction of the junction box with respect to the valve body so that the electrical conduit port and the receptacle face the opposite direction from that of a conventional mounting. To provide continuity of operation of the solenoids, the ground connectors and the indicator lamps then involves substantial rewiring at the site when using prior art structures.

The problems of maintaining continuity of operation is equally great when the electrical apparatus includes an electrical plug that is plugged onto the terminal block, because prior art structures have their connectors oriented so that the plug cannot be rotated one hundred eighty degrees and then be replugged into the terminal block.

Still additional problems exist in relation to the prior art structures when rewiring is necessitated in those directional valves which have lamps to indicate when and which solenoid is energized. Code restrictions in many parts of the country limit the number of leads that can be connected to a connector of the terminal block, necessitating splicing the electrical leads from the lamp into the leads from the solenoid. In the prior art structures, these spliced connections must be disconnected and new splicings made if the junction box is to be reversed in its mounting on the valve body. Not only is a significant labor cost involved in making a change of this character, but the likelihood of making an improper connection is significant.

Thus, the prior art structures in this field leave much to be desired, because unduly complex wiring is involved for operating the directional valves, and the connections must be made in relatively confined spaces creating substantial labor problems. This is especially true during installation of the directional valves at a local site where the original wiring to the terminal blocks must be changed to accommodate local mounting requirements. To overcome these problems, there is a need for improved terminal block apparatus which can be assembled more easily and quickly, and which when assembled, will allow the reversal of the position of the electrical plug and junction box while providing electrical circuits that have continuity of operation relative to grounding, solenoids and indicator lamps.

SUMMARY OF THE INVENTION

The present invention has overcome the inadequacies of the prior art and provides improved electrical apparatus for a directional valve which has met the needs of industry that are set forth above.

To accomplish these purposes, an improved terminal block has been provided wherein the connectors are arranged in a symmetrical pattern so that the associated electrical plug can be plugged into the terminal block in either of two diametrically opposed positions and the desired continuity of operation of ground, solenoid and lamp indicator means will be achieved. The terminal block can be used either with plugs that are separate from the junction box or in a novel concept, with the plug molded as an integral part of the junction box.

According to one form of the present invention, an improved terminal block is provided for use in a solenoid operated directional valve having a valve body on which solenoids are mounted on both opposite ends, the terminal block having a longitudinal axis and a transverse axis, and the electrical connectors for the two solenoids are linearly aligned on the transverse axis. The electrical connectors for one of the solenoids are located on the transverse axis on opposite side and equidistant from the longitudinal axis, and the electrical connectors for the other solenoid are located outboard thereof on opposite sides of the longitudinal axis and also equidistant from the longitudinal axis. By virtue of this construction and arrangement, a plug which has connectors arranged to fit those of the terminal block can be positioned in either of two locations, that is, with the plug either in a first position or in a second position rotating 180° from the first position. The ground connection can be located on the longitudinal axis but offset from the transverse axis for economy of space, and under these circumstances, a second ground connector can be placed equidistant on the opposite side of the transverse axis so that when the plug is reversed between its two positions, the terminal block will provide a ground connector with which it can be engaged. To avoid the necessity of two complete ground circuits, the two ground connectors in the terminal plug are preferably connected together electrically so that a ground connection made by the plug in either of the two ground connectors of the terminal block will serve the necessary grounding purposes.

In the preferred terminal block, lamp sockets are also provided which are spaced from the transverse axis so as to be adjacent to their associated solenoids for indicating when each solenoid is energized, and the lamp sockets are electrically connected to the electrical connectors in the terminal block that are associated with that particular solenoid. The lamp sockets are also symmetrically located relative to the longitudinal axis so that the junction box can be rotated one hundred eighty degrees and a light indicator means in the junction box will reflect the illumination of the lamp so as to properly indicate which solenoid is energized.

It will be recognized that the features of the invention that are utilized in connection with a solenoid operated directional valve that has solenoids at both ends of the valve body can also be utilized in conjunction with a directional valve having only one solenoid. In the former case, the associated electrical plug will have a total of five connectors, whereas in a directional valve having only one solenoid, only three connectors will be used, these comprising one ground connector and the two electrical connectors for supplying current through the leads from the associated solenoid. Likewise, the features of the invention can be used in a terminal block which does not employ lamps as the indicator means of the directional valve.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 illustrates a first embodiment of the present invention, showing a solenoid operated directional valve with the valve body and terminal body in vertical section and the electrical plug and a separate junction box being shown in phantom;

FIG. 2 is a top plan view of the embodiment of FIG. 1, showing the arrangement of the connectors in the terminal block;

FIG. 3 is a vertical section of the junction box and the separate electrical plug located therein;

DESCRIPTION OF THE PREFERRED EMBODIMENTS

Figure 4:
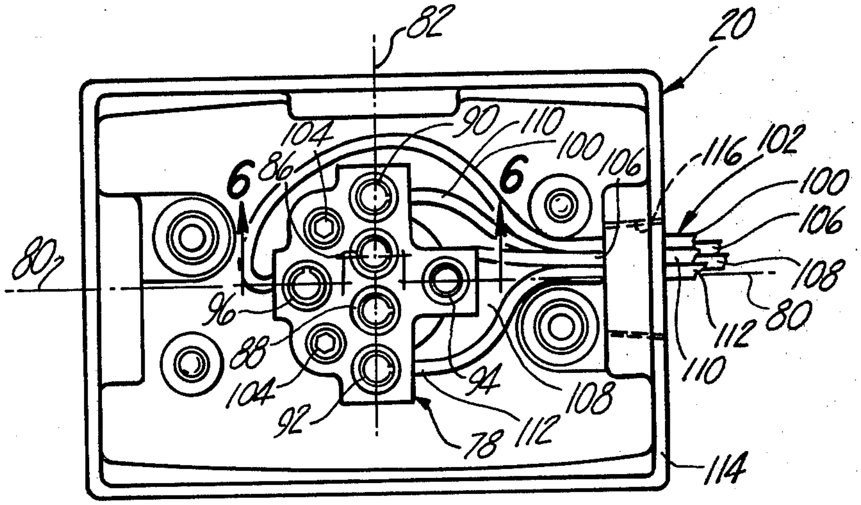
FIG. 4 is a bottom plan view of the junction box and electrical plug shown in FIG. 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the embodiment of the invention illustrated in FIGS. 1-6, inclusive, will initially be described. As there shown, the solenoid operated directional valve 10 has a valve body 12 on the opposite ends of which are mounted solenoids 14 and 16. The valve body 12 has on its one side a mounting surface 18 on which is releasably secured a junction box 20. Also mounted on the mounting surface 18 within the confines of the junction box 20 is the terminal block 22.

The valve body 12 has a bore 24 that contains a plurality of axially spaced annuli 26 which communication with a plurality of passageways 27 (not all of which are shown) for flow of hydraulic fluid. Mounted within the valve body 12 is a conventional valve spool 28 which has opposite ends 30 and 32 that are adapted to be engaged by the solenoid pins 34 and 36 of the solenoids 14 and 16, respectively. In the conventional manner, energizing one or the other of the solenoids 14 and 16 will cause the associated solenoid pins to be moved axially so that the spool is shifted to allow desired flow of the hydraulic fluid in the valve body 12 in the normal manner. Conventional springs 38 and 40 are associated with the spool 28 for returning the spool 28 to its neutral position when the solenoids are not energized.

The terminal block 22 has a longitudinal axis 42 and a transverse axis 44. Fastening of the terminal block 22 on the valve body 12 is accomplished by the round head screw 44 and the screw connector 46, both of which are located on the longitudinal axis 42. The screw connector 46 is displaced a limited distance from the transverse axis 44 for a purpose to be described subsequently. The screw connector 46 is screwed into the valve body 12 and has an upper portion adapted to receive the ground connector of a plug as will presently be described.

The terminal block 22 has a body portion 48 that is molded of a suitable dielectric plastics material, and in the body portion 48 are a first pair of electrical connectors 50 and 52 which are located on the transverse axis 44 and are spaced equidistantly on opposite sides of the longitudinal axis 42. Each of the electrical connectors 50 and 52 include an internally threaded socket 54 which is molded in the body portion 48 and the screw connector 56 which is threadedly connected to the socket member 54. Electrical leads 56 and 58, which have terminal rings at their ends, are connected to the electrical connectors 50 and 52. The electrical leads 56 and 58 extend to the solenoid 14 so that when electrical current is supplied across these leads, the solenoid 14 will be energized. The connector 46, which serves as a ground connector could be located between the electrical connectors 50 and 52, but in the interest of conserving space and reducing the width of the terminal block 22, the connector 46 is offset from the transverse axis 44.

A second pair of electrical conductors 60 and 62 are similarly mounted in the body portion 48 of the terminal block 22 along the transverse axis 44 thereof. The electrical connectors 60 and 62 are positioned outboard of the electrical connectors 50 and 52 and also are equidistant from the longitudinal axis 42. Connected to the electrical connectors 60 and 62 are the electrical leads 64 and 66 which extend from the solenoid 16 so that when electrical current is supplied across the electrical leads 64 and 66, the solenoid 16 will be energized.

Also forming a part of the terminal block 22 are the lamp indicator means 68 and 70, the former having a socket in which a lamp 72 is mounted and the latter having a socket in which the lamp 74 is mounted. The lamp 72 is adjacent to the solenoid 14, and the lamp 74 is adjacent to the solenoid 16. Electrical conductors (not shown) extend internally within the body portion 48 from the lamp socket for the lamp 72 to the electrical connectors 50 and 52, and additional electrical conductors (not shown) extend internally within the body portion 48 from the socket for the lamp 74 to the electrical connectors 60 and 62. Thus, the lamps 72 and 74 together with their associated sockets, are symmetrically located with respect to the transverse axis 44 and the longitudinal axis 42 and are equidistant respectively from each of these axes.

Another feature in the terminal block 22 is the partition 76 which extends between the electrical connectors 52 and 54 and the electrical connectors 60 and 62 so as to provide pockets to facilitate making the proper installations of the electrical leads 56 and 58 onto their respective electrical connectors and the electrical leads 64 and 66 onto their respective electrical connectors.

Adapted to be plugged onto the terminal block 22 is the electrical plug 78 which has a longitudinal axis 80 and a transverse axis 82 corresponding to the axes 42 and 44 of the terminal block 22. The electrical plug 78 has a body portion 84 molded of a suitable dielectric plastics material and in which are located a first pair of electrical connectors 86 and 88. These electrical connectors are located on the transverse axis 82 on opposite sides of the longitudinal axis 80 and equidistant therefrom and are adapted to make electrical connection with the electrical connectors 50 and 52 of the terminal block 22. A second pair of electrical connectors 90 and 92 are positioned outboard of the electrical connectors 86 and 88 and are similarly located on the transverse axis 82. The electrical connectors 90 and 92 are on opposite sides of the longitudinal axis 80 and are equidistant therefrom. These electrical connectors are adapted to make electrical connection with the electrical connectors 60 and 62 of the terminal block 22.

Figure 6:
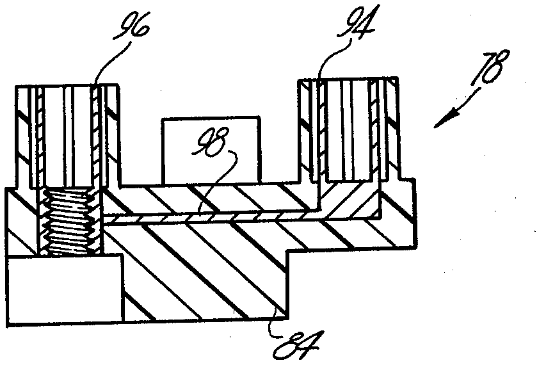
FIG. 6 is a section of the electrical plug taken on the lines 6—6 of FIG. 4.

Also formed on the body portion 84 are two ground connectors 94 and 96 which are located on the longitudinal axis 80 and are on opposite sides of the transverse axis 82 and equidistant therefrom. Either one or the other of these ground connectors is adapted to be connected to the ground connector 46 of the terminal block 22. As shown in FIG. 6, the ground connectors 94 and 96 are electrically connected by the conductor 98 which preferably is molded in the body portion 84. A ground lead 100 is connected to the ground connector 96 so that either ground connector 94 or 96 will provide a suitable ground in the conduit 102 via the lead 100. If it is desired to secure the electrical plug 78 to the junction box 20 this can be accomplished with the use of the screws 104.

Figure 7:
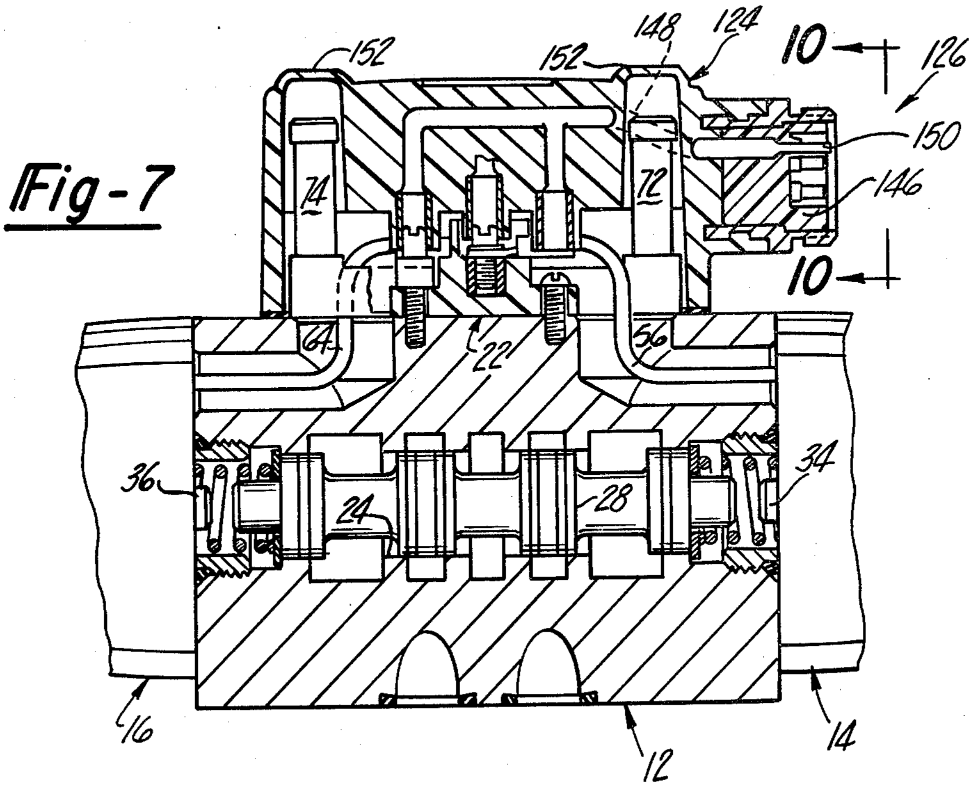
FIG. 7 is a vertical section through a second embodiment of the present invention showing an arrangement of the junction box wherein the electrical plug is molded therein and is an integral part thereof.
Figure 8:
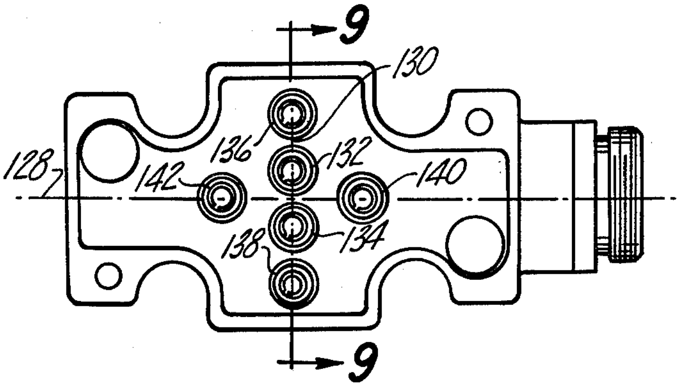
FIG. 8 is a bottom plan view of the integral junction box and electrical plug in the embodiment of FIG. 7.
Figure 9:
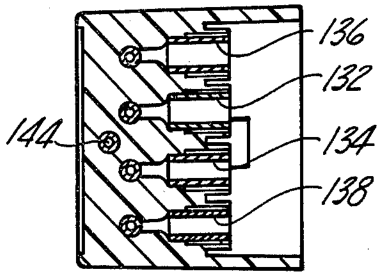
FIG. 9 is a section taken on the lines 9—9 of FIG. 8.
Figure 10:
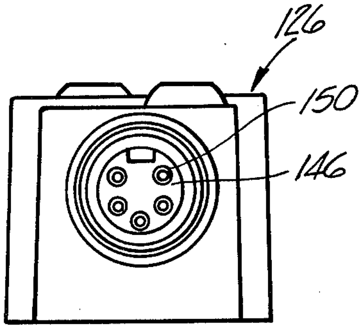
FIG. 10 is an end elevational view of the junction box as viewed from the lines 10—10 of FIG. 7.
Figure 11:
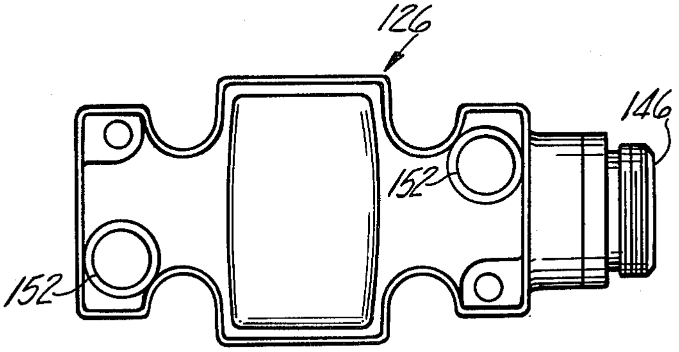
FIG. 11 is a top plan view of the integral junction box and electrical plug.

The conduit 102 includes five conductors, one being the ground 100 and the others being the conductors 106 and 108 which are connected respectively to the electrical connectors 86 and 88, and the remaining two conductors 110 and 112 are connected respectively to the electrical connectors 90 and 92. The conduit 102 extends through the one end 114 of the junction box 20 by way of the conduit port 116. Any suitable receptacle, such as is shown in the second embodiment in FIG. 7 may be employed, or any suitable seal member can be utilized to close this port around the conduit 102.

The junction box 20 also has a pair of light indicator means 118, only one of which is shown, which are located so as to be positioned over the lamps 72 and 74 of the terminal box 22 and thereby to be adjacent to the solenoids 14 and 16. The junction box 20 also has screws 120 adapted to be threadedly connected to the valve body 12 at the locations 122 for removably securing the junction box to the valve body 12.

Figure 5:
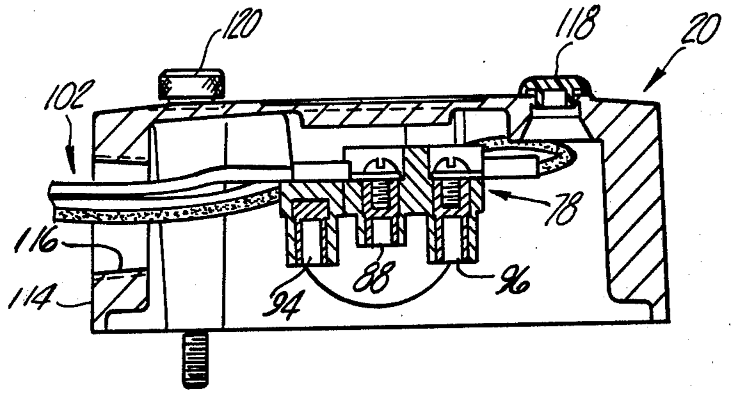
FIG. 5 is a view of the electrical plug and junction box of FIG. 3, but showing these components when they have been rotated 180°.

Thus, it can be understood that the symmetrical arrangement of the electrical connectors of the terminal block 22 and the location of its ground connector 46 and the symmetrical arrangement of its lamps will allow the electrical plug 78 and the junction box 20 to be plugged into the terminal block 22 and secured to the valve body 12 in a first position, and to be removed therefrom and rotated one hundred eighty degrees to the position shown in FIG. 5 after which they can be replugged and resecured on the terminal block and valve body, and continuity of operation of the solenoids, the ground connections, and the lamp indicating means will be provided. Thus, essentially no additional labor costs will be involved if it becomes necessary to reverse the electrical plug 78 and junction box 20 at a local site of installation of the directional valve 10. Furthermore, a significant portion of the time consuming labor costs for originally assembling and wiring the components has been eliminated.

The unique terminal block 22 can be used in conjunction with other types of electrical plugs and junction boxes. An improved integral junction box and electrical plug 124 may be employed as shown in the embodiment of the solenoid operated directional valve 126 in FIGS. 7–11. In this embodiment of the invention, the solenoids 14 and 16, the valve body 12 and the internal parts thereof, and the terminal block 22 are the same as those described in conjunction with the directional valve 10, and therefore, these parts will not be described again.

The integral junction box and electrical plug 124 have a longitudinal axis 128 and a transverse axis 130 corresponding to the axes 42 and 44 of the terminal block 22. Electrical connectors 132 and 134 are provided for connection with the electrical connectors 50 and 52 of the terminal block 22, and electrical connectors 136 and 138 are similarly provided for connection with the electrical connectors 60 and 62. Also, ground connectors 140 and 142 are provided, one of which can be connected to the ground connector 46 of the terminal block 22. As in the previous embodiment of the present invention, the ground connectors 140 and 142 are electrically connected by a conductor 144.

As shown in this form of the invention, the electrical connectors in the plug are connected to the electrical receptacle 146 and by the plurality of leads 148 to the pins 150. In this form of the invention, a receptacle 146 is provided for receiving a five pin plug for use with the double solenoid valve 126. If a single solenoid valve were to be used, a receptacle for accommodating a three pin plug would be required. Then, a simplified plug construction and a simplified terminal block construction could be used wherein only two electrical connectors would be required on the transverse axis 44.

In the directional valve 126, the integral junction box and electrical plug 124 is molded from a suitable plastics material having light indicator means 152 for use in association with the lamps 72 and 74. Thus, in this embodiment of the invention, the various components and the electrical wiring thereof can readily be assembled at minimum labor costs and subsequently the integral junction box and receptacle 124 can be rotated one hundred eighty degrees and plugged back in place on the terminal block 22 with minimal labor costs. Further, this can be done without any danger that erroneous wiring will occur, and it can be done assuring continuity of operation of the solenoids, grounding and light indicator means.

In the form of the invention that have been described above, electrical leads such as shown for example at 56 and 58, have terminal rings at their ends for connection to the electrical connectors 50 and 52. If desired, other types of conventional connection means may be employed in place thereof without departing from the scope of the present invention. Thus, if desired, a conventional arrangement may be used wherein the terminal rings are replaced with mere wire segments that can be inserted into apertures in the connectors 50 and 52 and the wire segments can be secured thereto by set screws or the like. This arrangement has the advantage of conserving space within the junction box 20.

What is claimed:

1. A solenoid operated directional valve comprising a valve body having a solenoid mounted on one of its ends and a mounting surface on one of its sides, a junction box releasably secured on said mounting surface and constructed to receive electrical conduit means at its one end, a terminal block mounted on said mounting surface within said junction box, said terminal block having a ground connector and a pair of electrical connectors to which a pair of electrical leads from said solenoid are connected for completing a circuit with the solenoid, and an electrical plug plugged into said terminal block and having ground and electrical connectors in engagement with corresponding connectors of said terminal block, said electrical plug having its connectors connected to corresponding ground and electrical conductors of said electrical conduit means so that electric current for energizing said solenoid can be supplied by said electrical conduit means, characterized in that the connectors in said terminal block and in said electrical plug are arranged so that the electrical plug can be plugged into the terminal block in a first position in which the junction box is positioned to have its one end facing in the direction of said solenoid or in a second position in which the electrical plug is rotated one hundred eighty degrees and in which the junction box is positioned to have its one end facing in the opposite direction of said solenoid, the arrangement of the connectors in the terminal block and the electrical plug being such that an electrical circuit will be closed through said solenoid and a ground connection will be completed so as to provide continuity of operation of the solenoid and the ground connection irrespective of whether the electrical plug is in its first or its second position.

2. The solenoid operated differential valve that is defined in claim 1, and further characterized in that said electrical plug and said junction box are separate structures.

3. The solenoid operated differential valve that is defined in claim 1, and further characterized in that said electrical plug and said junction box are an integral structure.

4. The solenoid operated differential valve that is defined in claim 1, and further characterized in that said terminal block has a longitudinal axis located midway between its pair of electrical connectors, and its ground connector is located on said longitudinal axis.

5. The solenoid operated differential valve that is defined in claim 4, and further characterized in that said terminal block has a transverse axis perpendicular to said longitudinal axis, and its pair of electrical connectors are located on said transverse axis.

6. The solenoid operated differential valve that is defined in claim 4, and further characterized in that said ground connector of the terminal block is located on said longitudinal axis a limited distance from said transverse axis, and said electrical plug has two ground connectors spaced apart equidistant from said transverse axis and on opposite sides thereof so that one of the two ground connectors can engage the ground connector of the terminal block when the electrical plug is in its first position, and the other ground connector of the electrical plug can engage the ground connector of the terminal block when the electrical plug is in its second position, said two ground connectors being electrically connected.

7. The solenoid operated differential valve that is defined in claim 1, and further characterized in that said junction box has light indicator means near each of its ends, and said terminal block has a lamp means disposed adjacent to said one end of the valve body and associated in illuminating relationship with one of said light indicator means, said lamp means being in said electrical circuit with said solenoid to illuminate the light indicator means adjacent to the solenoid when said solenoid is energized, said light indicator means being located on said junction box so that the junction box can be rotated one hundred eighty degrees with the electrical plug either to the first or to the second position of the electrical plug and the lamp means will be in illuminating relationship with the light indicator means adjacent to the solenoid so as to provide continuity of operation of the light indicator means irrespective of the position of the junction box.

8. A solenoid operated directional valve comprising a valve body having solenoids mounted on its opposite ends and a mounting surface on one of its sides, a junction box releasably secured on said mounting surface and constructed to receive electrical conduit means at its one end, a terminal block mounted on said mounting surface within said junction box, said terminal block having a ground connector and two pairs of associated electrical connectors to which pairs of associated electrical leads from said solenoids are connected for completing separate electrical circuits with the solenoids, and an electrical plug plugged into said terminal block and having ground and electrical connectors in engagement with corresponding connectors of said terminal block, said electrical plug having its connectors connected to corresponding ground and electrical conductors of said electrical conduit means so that electrical current for energizing either of said solenoids can be supplied through the separate electrical circuits by said electrical conduit means, characterized in that the connectors in said terminal block and in said electrical plug are arranged so that the electrical plug can be plugged into the terminal block in a first position in which the junction box is positioned to have its one end facing in the direction of one of said solenoids or in a second position with the electrical plug rotated one hundred eighty degrees and in which the junction box is positioned to have its one end facing in the direction of the other of said solenoids, the arrangement of connectors in the terminal block and the electrical plug being such that the separate electrical circuits will be closed through the same solenoids and a ground connection will be completed assuring continuity of grounding and continuity of operation of the solenoids irrespective of whether the electrical plug is in its first or its second position.

9. The solenoid operated directional valve that is defined in claim 8, and further characterized in that said terminal block has longitudinal and transverse axes and its two pairs of associated connectors are arranged linearly along said transverse axis, the associated electrical connectors of one pair being located inboard of the associated electrical connectors of the other pair and both pairs being in symmetrical relation to said longitudinal axis.

10. The solenoid operated directional valve that is defined in claim 9, and further characterized in that said ground connector is located along said longitudinal axis.

11. The solenoid operated directional valve that is defined in claim 10, and further characterized in that said ground connector is one of a pair of ground connectors, both ground connectors being located on said longitudinal axis in symmetrical relation to said transverse axis, said ground connectors being electrically connected together so that a ground connection is provided when a ground connector from said plug is inserted into electrical engagement either with one ground connector of the terminal block when the plug is in said first position or with the other ground connector of the terminal block when the plug is in said second position.

12. The solenoid operated directional valve that is defined in claim 9, and further characterized in that said terminal block includes two lamp sockets disposed symmetrically with respect to said axes, one lamp socket being electrically connected to one of said electrical circuits and the other lamp socket being electrically connected to the other of said electrical circuits.

13. The solenoid operated directional valve that is defined in claim 8, and further characterized in that an electrical conduit connection is mounted in said one end of the junction box and electrical leads extend from said electrical conduit connection to the electrical connectors of said electrical plug.

14. The solenoid operated directional valve that is defined in claim 13, and further characterized in that said electrical plug and said electrical leads from said electrical conduit connection are integrally formed in said junction box.

15. The solenoid operated directional valve that is defined in claim 8, and further characterized in that said terminal block has longitudinal and transverse axes, said terminal block including two lamp sockets disposed symmetrically with respect to said axes, one lamp socket being connected to the electrical circuit associated with one of said solenoids, and the other lamp socket being connected to the electrical circuit associated with the other of said solenoids.

16. The solenoid operated directional valve that is defined in claim 15, and further characterized in that lamps are mounted in said sockets, said lamps indicating when illuminated which of the solenoids are energized, and said junction box has cavities located therein for receiving each of said lamps, said cavities having light transmitting means to permit viewing of said lamps from the exterior of said junction box, thereby assuring continuity of operation of the lamps irrespective of whether the electrical plug is in its first or its second position.

17. A solenoid operated directional valve comprising a valve body having solenoids mounted on its opposite ends and a mounting surface on one of its sides, a junction box releasably secured on said mounting surface, said junction box having light indicator means near its ends for indicating when a solenoid is energized and being constructed to receive electrical conduit means at its one end, a terminal block mounted on said mounting surface within said junction box, said terminal block having a ground connector, two pairs of associated electrical connectors to which pairs of associated electrical leads from said solenoids are connected for completing separate electrical circuits with the solenoids, and lamp means associated in interfitting relationship with said light indicator means and disposed adjacent to said opposite ends and in said electrical circuits for signaling which one of said solenoids is energized, and an electrical plug plugged into said terminal block and having ground and electrical connectors in engagement in interfitting relationship with corresponding connectors of said terminal block, said electrical plug having its connectors connected to corresponding ground and electrical conductors of said electrical conduit means so that electrical current for energizing said solenoids can be supplied through the separate electrical circuits by said electrical conduit means, characterized in that the interfitting parts comprising (1) the connectors in said terminal block and in said electrical plug and (2) the light indicator means in said junction box and the lamp means in said terminal block are arranged symmetrically with respect to longitudinal and transverse axes of said terminal block so that the electrical plug and the junction box can be rotated one hundred eighty degrees from a first position wherein said one end of the junction box faces in the direction of one of said solenoids to a second position wherein said one end of the junction box faces in the direction of the other of said solenoids, the arrangement of the interfitting parts of the terminal block, the electrical plug and the junction box being such that continuity of operation of the electrical grounding, the light indicator means and the solenoids is provided when the electrical plug and the junction box are in either their first position or their second position.

18. The solenoid operated differential valve that is defined in claim 17, and further characterized in that said electrical plug and said junction box are separate structures.

19. The solenoid operated differential valve that is defined in claim 17, and further characterized in that said electrical plug and said junction box are an integral structure.

20. The solenoid operated differential valve that is defined in claim 17, and further characterized in that said terminal block has a partition extending transversely thereof on its upper side to separate its electrical connectors associated with one solenoid from its electrical connectors associated with the other solenoid.

* * * * *